United States Patent
Fisher

[15] 3,698,166
[45] Oct. 17, 1972

[54] REEL CONSTRUCTION WITH HEXAGONAL SPIDERS FOR MOUNTING BOTH BATS AND TINE BARS

[72] Inventor: Ivan E. Fisher, Owatonna, Minn.

[73] Assignee: Owatonna Manufacturing Company, Owatonna, Minn.

[22] Filed: June 2, 1971

[21] Appl. No.: 149,195

[52] U.S. Cl. .................................. 56/220, 56/226
[51] Int. Cl. ........................................... A01d 57/00
[58] Field of Search .................. 56/220, 226, 227

[56] References Cited

UNITED STATES PATENTS 3,472,008  10/1969  Hurlburt ................. 56/226
3,224,177  12/1965  Adee ..................... 56/226 UX

*Primary Examiner*—F. Barry Shay
*Assistant Examiner*—J. A. Oliff
*Attorney*—Merchant & Gould

[57] ABSTRACT

A feeding reel including an axial tubular body and a plurality of axially spaced spider elements rigidly mounted thereon, these spider elements defining hexagons having alternate sides of equal relatively long length and alternating sides of equal relatively short length, flanges projecting in directions axially of the reel and defining the relative long side of the hexagons, elongated reel bats mounted on the flanges, and tine mounting bars journaled in bearings on the spider elements adjacent the short side defining edges thereof, the tine mounting bars extending in directions axially of the reel.

2 Claims, 6 Drawing Figures

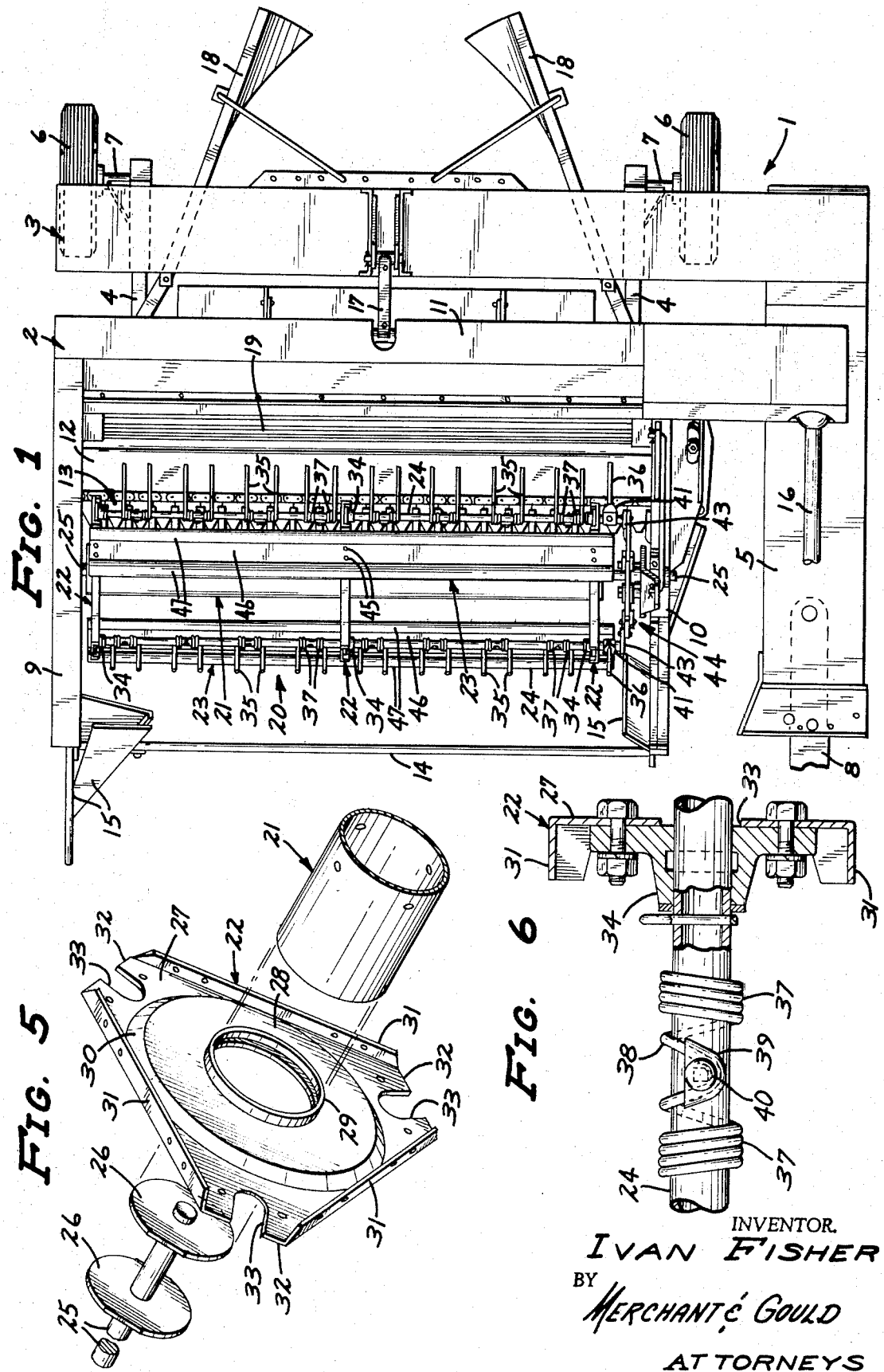

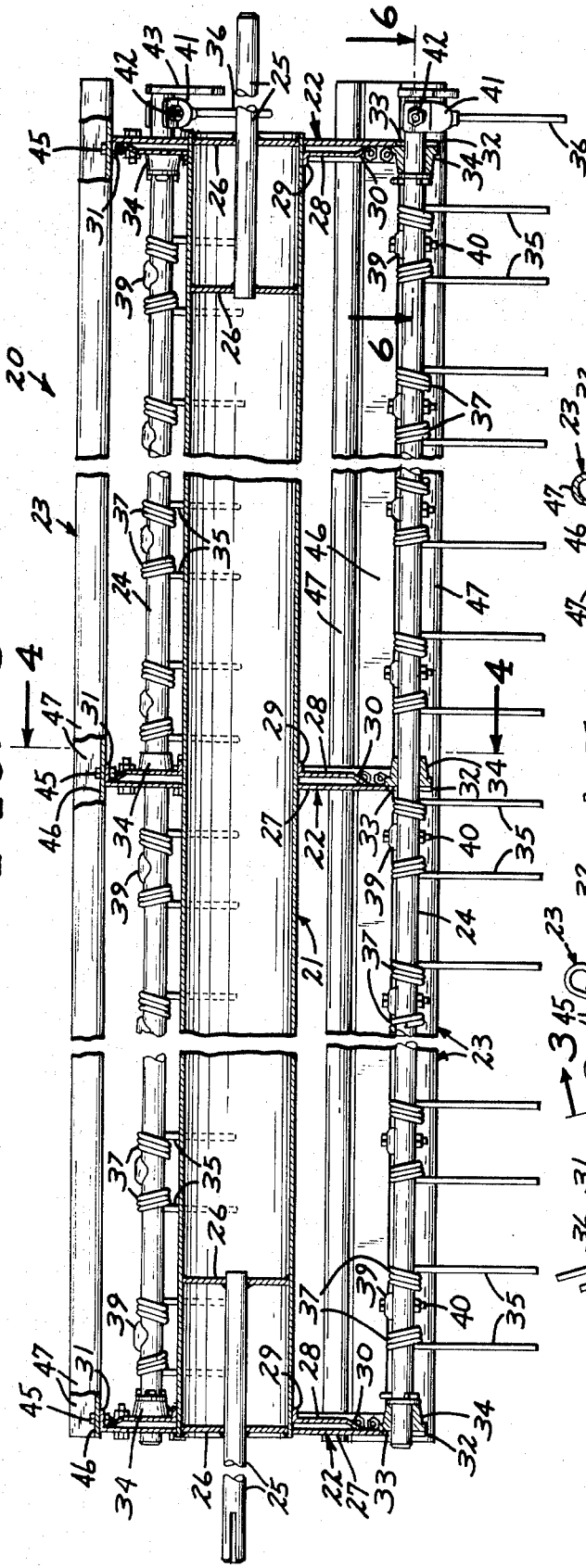

3,698,166

REEL CONSTRUCTION WITH HEXAGONAL SPIDERS FOR MOUNTING BOTH BATS AND TINE BARS

BACKGROUND OF THE INVENTION

Heretofore, feeding reels for agricultural implements such as mowers, swathers, and other harvesting machinery, have been relatively flimsy in construction, including central shafts of relatively small diameter, reels or spiders including radial spoke construction mounted on the central shafts, and reel bats made of wood or sheet metal, the reels being substantially lacking in rigidity and structural strength for feeding heavy, wet or tangled crops. Reels having feeding tines thereon have been reinforced by having heavier construction, these being quite costly to produce.

SUMMARY OF THE INVENTION

An important object of this invention is the provision of a reel that is relatively simple and inexpensive to produce and which is of substantial rigidity and strength.

Another object of this invention is the provision of a reel having oscillatory tine equipped bars and means for quickly and easily dismounting and remounting the bars.

To the above ends, I provide a rigid axial tubular body, axial shafts extending from opposite ends of the body, and a plurality of spiders disposed on the body in axially spaced relationship. Each spider is formed to provide a hexagonal outline having alternate straight sides of equal relatively long length, and alternating sides of equal relatively short length, the relatively long sides being defined by flanges protecting axially with respect to the spider. A plurality of rigid metallic bat elements are each rigidly secured in face to face engagements with a different one of the flanges on each spider element and adjacent a different one of the short sides defined by the spider element. A plurality of bearings are removably mounted on each spider adjacent each of the shorter sides defined thereby, the bearings of each spider being aligned with respective bearings on the other spiders, and elongated tine equipped shafts are journaled in the aligned bearings and extend in spaced parallel relationship to adjacent ones of the bat elements. Each spider element comprises a main plate-like portion having the above mentioned hexagonal outline, and a disk-like reinforcing member having a peripheral portion secured to the plate-like portion, the plate-like portion and reinforcing member having aligned central openings for reception of the tubular body, the plate-like portion and reinforcing member being welded to the tubular body in axially spaced relationship.

DESCRIPTION OF THE DRAWINGS

FIG. 1 is a view in top plan of a swather having the reel of this invention mounted thereon;

FIG. 2 is an enlarged view in end elevation of the reel of this invention, shown as being removed from the swather of FIG. 1, some parts being broken away;

FIG. 3 is an axial section taken substantially on the line 3—3 of FIG. 2, some parts being broken away;

FIG. 4 is a transverse section taken substantially on the line 4—4 of FIG. 3;

FIG. 5 is a fragmentary view in exploded perspective of a portion of the reel of this invention; and FIG. 6 is an enlarged fragmentary detail taken substantially on the line 6—6 of FIG. 3.

DETAILED DESCRIPTION OF THE PREFERRED EMBODIMENT

The reel of this invention may be mounted on any mobile agricultural implement which uses a reel for the purpose of aiding in the feeding of crop material to a mower or other mechanism on the implement, and is shown in FIG. 1 as being mounted on a conventional swather and crop conditioner that is adapted to be pulled over a field by a tractor or similar prime mover. The swather shown comprises a frame 1 having front and rear frame sections 2 and 3 respectively, connected by forwardly and rearwardly extending frame members 4 and an end frame member 5. The frame 1 is supported by ground engaging tire equipped wheels 6 that are journaled on shafts 7 mounted at the rear ends of the frame members 4. The end frame member 5 is adapted to be connected to a tractor, not shown, but by a conventional hitch bar 8, shown fragmentarily in FIG. 1. The front frame section 2 includes a pair of laterally spaced frame members 9 and 10 connected by a transverse frame member 11 and a guide member 12 that supports a conventional sickle mower 13. At their front ends, the frame members 9 and 10 are connnected by a transverse tie rod 14, the front ends of the frame member 9 and 10 having mounted thereon conventional and well-known crop guide members 15. The mower 13, in and of itself, does not comprise the instant invention and, for the sake of brevity, further detailed showing thereof is omitted. It should suffice to state that the mower 13 is operated by power transmission mechanism including a drive shaft 16 that may be assumed to be connected to the power take-off of the tractor, not shown. The front frame 2 is further supported from the rear frame 3 by a rigid link 17, and windrowing shields 18 are adjustably mounted on the rear frame 3 for guiding material cut by the mower 13 into windows of desired widths. The swather of FIG. 1 is further provided with a pair of cooperating corrugated or toothed crop conditioning rolls 19, one of which is shown, and between which the cut crop is moved rearwardly in the conventional manner.

The feeding reel of this invention is indicated in its entirety by the reference character 20, and comprises an elongated tubular axial body 21, a plurality of axially spaced spider elements 22 mounted thereon, longitudinally extending reel bats 23 and longitudinally extending tine bars 24. The tubular body 21 is provided at its opposite ends with axially outwardly projecting central shafts 25 that are each welded to a pair of axially spaced radial anchoring flanges 26 that are disposed within opposite end portions of the tubular body 21 and welded therein. The shafts 25 are journaled in suitable bearings in the frame members 9 and 10, one of the shafts 25 being keyed for reception of a power transmission not shown, but which may be assumed to be contained within the frame member 9 for connection to the drive shaft 16 in the usual manner, whereby rotation may be imparted to the reel 20.

The spider elements 22 are identical, each comprising a main plate-like portion 27 and disk-like reinforcing member 28, the portion 22 and member 28 having central openings closely receiving the tubular body 21, the reinforcing member 28 having an inner circumferential flange 29 defining the central opening therein. Further, the reinforcing member 28 is formed to provide an angular rim portion 30 that is welded or otherwise rigidly secured to its respective plate-like portion 27, each plate-like portion 27 and its respective reinforcing member 28 being welded or otherwise rigidly secured in axially spaced relationship to the tubular body 21. Each plate-like portion 27 has an outline in the form of a hexagon having alternate relatively long sides of equal length and alternating relatively short sides of equal length. The relatively long sides of the hexagon are defined by elongated flanges 31 that project in a given direction axially with respect to the reel 20, the relatively short sides of each hexagon being defined by edges 32 of each plate-like portion 27. The spider elements 22 are mounted on and secured to the tubular body 21 in such arrangement that the flanges 31 of each spider element 22 are each coplanar with a flange 31 of the other of the spider elements 22.

Each plate-like portion 27 is formed to provide a plurality of notches 33 that open radially outwardly of the edges 32 thereof, the notches 33 of each spider element 22 being aligned with the notches 33 of the other of the spider elements 22 of the reel 20. Each aligned group of notches 33 receives a different one of the tine bars 24, the bars 24 being journaled in bearings 34 bolted or otherwise rigidly secured to each of the plate-like portions 27 adjacent the notches 33 thereof. Each of the tine bars 24 has mounted thereon a plurality of pairs of connected tines 35 and a single tine 36, the tines 35 of each pair thereof being connected by torsion spring portions 37 loosely wrapped around their respective tine bar 24, and a central connecting portion 38 that is rigidly secured to the respective tine bar 24 by a mounting clip 39 and an anchoring screw 40, see particularly FIG. 6. The tines 36 are disposed longitudinally outwardly of a spider 22 at one end of the reel 20 and have inner ends mounted in flexible clips 41 that are secured to their respective tine bars 24 by nut equipped screws or the like 42, see particularly FIG. 3. Each tine bar 24, longitudinally outwardly of its respective tine 36, is provided with a crank element 43 that is adapted to be connected to suitable control mechanism, indicated generally at 44 in FIG. 1. The cam mechanism, in and of itself, does not comprise the instant invention. Hence, for the sake of brevity, further showing and description thereof is omitted.

The reel bats 23 are three in number, each of the reel bats 23 being secured to a coplanar group of flanges 31 by means of nut equipped screws 45. It will be noted, with reference to FIGS. 2 and 4, that each bat 23 is disposed adjacent a different one of the tine bars 24 and, for the purpose of the present example, is disposed forwardly in the normal direction of rotation of the reel, of its adjacent tine bar 24. The normal direction of rotation of the reel 20 is counterclockwise with respect to FIGS. 2 and 4, and as indicated by arrows thereon. The reel bats 23, as well as the plate-like portion 27 and reinforcing members 28 of the spider elements 22, are preferably stamped from sheet metal, the reel bats 23 including generally flat transversely central portion 46 and laterally spaced parallel tubular portions 47 that extend longitudinally of the bats 23 and which add rigidity thereto. It will be noted, with reference to FIGS. 2 and 4, that the bat mounting screws 45 extend through the flat intermediate portions 46 of the bats 23.

In addition to the rigidity afforded by the tubular bead portions 47 of the reel bats 23, the spider flanges 31 and reinforcing members 28 cooperate with the tubular structure of the body 21 to add strength and rigidity to the entire reel structure while maintaining the weight thereof at a very satisfactory minimum. Further, with the above arrangement it will be seen that the tine bars 24 may be quickly and easily removed from the spiders 22 and it is necessary to replace tines 35 or the tine bars 24 themselves, and that the tine bars 24 may be quickly and easily replaced when repairs have been effected.

This invention has been thoroughly tested and found to be completely satisfactory for the accomplishment of the objectives set forth; and, while a commercial embodiment of the reel of this invention has been shown and described, it will be understood that the same is capable of the modification without departure from the spirit and scope of the invention, as defined in the claims.

What is claimed is:

1. A reel for agricultural implements comprising:
   a. an elongated tubular axial body;
   b. shaft means projecting axially outwardly from opposite ends of said body;
   c. a plurality of axially spaced spider elements rigidly mounted on said tubular body, each of said spider elements defining a hexagon outline having alternate straight sides of equal relatively long length and alternating sides of equal relatively short length, each spider element including a main plate-like portion and axially projecting flanges extending longitudinally of and defining said relatively long sides;
   d. a plurality of elongated bat elements extending in directions axially of said tubular body and each mounted on a different one of the flanges of each of said spider elements adjacent a different one of said short sides defined by the spider elements;
   e. said spider elements defining notches opening radially outwardly of said relatively short side-defining edges;
   f. aligned bearings mounted on said spider elements adjacent said relatively short side-defining edges in axial alignment with said notches;
   g. tine equipped bars journalled in aligned ones of said bearings, each of said bars being disposed adjacent a different one of said bat elements and parallel thereto;
   h. and a plurality of reinforcing members each having a peripheral edge portion rigidly secured to the plate-like portion of a different one of said spider elements redially inwardly of said spider element flanges, said plate-like portion of each spider element and it respective reinforcing member having central openings for reception of said tubular body and being rigidly secured to said body adjacent said central openings and in axially spaced relationship.

2. The reel defined in claim 1 in which said shaft means comprises a pair of axially aligned shaft elements each at an opposite end of said tubular body, characterized by a pair of axially spaced shaft mounting flanges on each of said shaft elements and rigidly secured within said tubular body.

* * * * *